(12) United States Patent
Hardin et al.

(10) Patent No.: US 6,802,672 B2
(45) Date of Patent: Oct. 12, 2004

(54) LEACHATE DISTRIBUTION SYSTEM

(75) Inventors: Kristen Z. Hardin, Conroe, TX (US); Boyd J. Ramsey, The Woodlands, TX (US)

(73) Assignee: GSE Lining Technology, Houston, TX (US)

( * ) Notice: Subject to any disclaimer, the term of this patent is extended or adjusted under 35 U.S.C. 154(b) by 0 days.

(21) Appl. No.: 10/354,413

(22) Filed: Jan. 30, 2003

(65) Prior Publication Data

US 2004/0151548 A1 Aug. 5, 2004

(51) Int. Cl.⁷ ................................................. B09B 1/00
(52) U.S. Cl. ............................ 405/129.65; 405/129.45; 405/43
(58) Field of Search ......................... 405/302.7, 129.25, 405/129.5, 129.57, 129.6, 129.65, 129.7, 129.75, 129.85, 129.95, 43–45, 50; 266/170, 101; 75/712

(56) References Cited

U.S. PATENT DOCUMENTS

| | | | | |
|---|---|---|---|---|
| 3,747,762 A | * | 7/1973 | White | 210/169 |
| 4,666,334 A | * | 5/1987 | Karaus | 405/43 |
| 4,720,209 A | * | 1/1988 | Iams | 405/45 |
| 4,810,131 A | * | 3/1989 | Turner | 405/129.5 |
| 5,201,609 A | * | 4/1993 | Johnson | 405/129.7 |
| 5,211,428 A | * | 5/1993 | Emerson et al. | 405/129.85 |
| 5,259,697 A | * | 11/1993 | Allen et al. | 405/129.9 |
| 5,857,807 A | * | 1/1999 | Longo, Sr. | 405/129.7 |
| 6,251,154 B1 | * | 6/2001 | van Rossen | 55/382 |
| 6,283,676 B1 | | 9/2001 | Hater et al. | |

* cited by examiner

Primary Examiner—John Kreck
(74) Attorney, Agent, or Firm—Wood, Phillips, Katz, Clark & Mortimer

(57) ABSTRACT

A waste collection site having a fluid distribution structure, and the structure and related method, the structure including a geocomposite for placement on and between levels of collected waste and at least one pipe extending up from the geocomposite and adapted to receive the fluid from horizontally extending feeder headers. The permeable material includes a spacing layer between top and bottom layers, and a discharge manifold at the bottom of the pipe discharges the fluid between the top and bottom layers. The bottom layer has a flow rate $F_B$ of fluid therethrough and the top layer has a flow rate $F_T$, where $F_B < F_T$, and the spacing layer maintains a space between the top and layers to permit flow of fluid therein to distribute the fluid. A geotextile usable as a layer of the geocomposite may be formed by modifying a non-woven needle punched geotextile, including the steps of calendaring the non-woven needle punched geotextile, and needle punching the non-woven needle punched geotextile after the calendaring step to create openings greater than 0.3 mm.

42 Claims, 3 Drawing Sheets

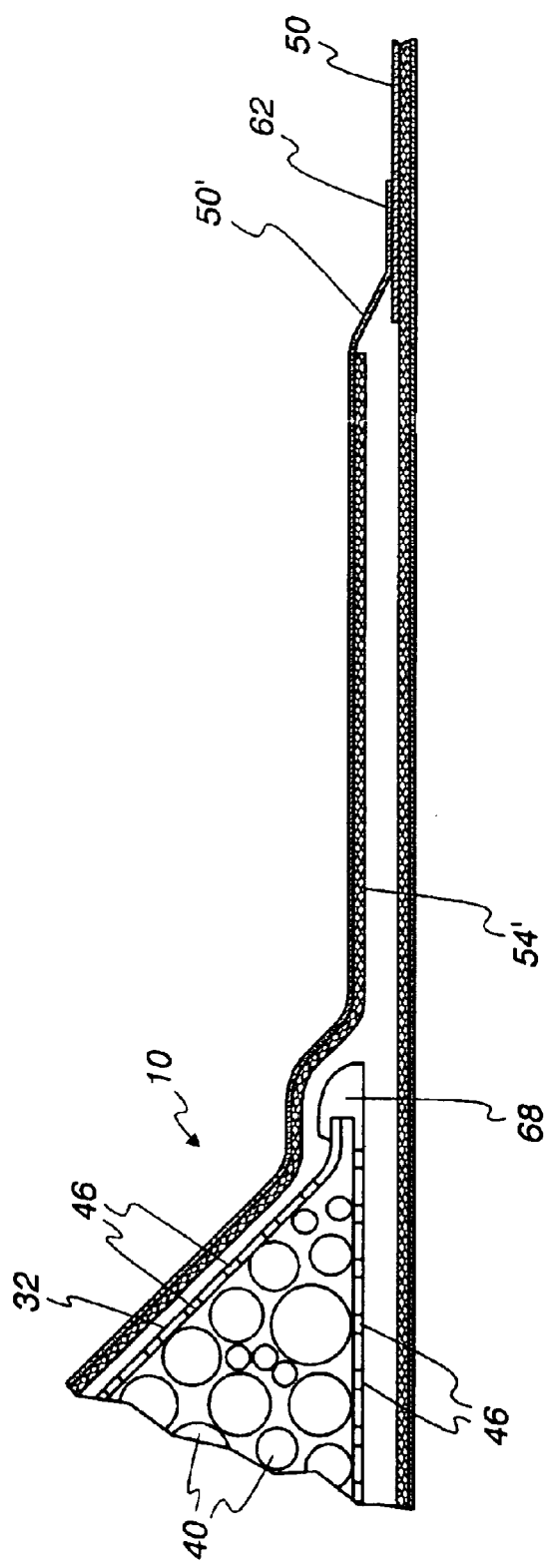
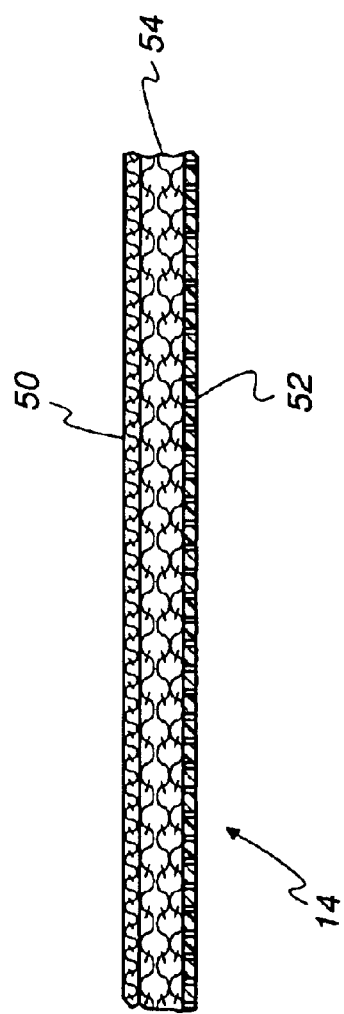

1

LEACHATE DISTRIBUTION SYSTEM

BACKGROUND OF THE INVENTION

The present invention is directed toward waste collection sites, and particularly toward the distribution of leachate at such sites. The invention further relates to an improved geotextile which may be advantageously used to distribute leachate.

Waste collection sites are, of course, well known and unavoidable requirements of today's societal structures. Such sites can require large amounts of valuable land, particularly in urban areas where land is most in demand. Also, while desirable uses can be made of such lands (for example, golf courses have been built on such sites), such desirable uses typically have to wait until the land is no longer being used for collect further waste and the often high pile of waste has stabilized. While use and stabilization of such sites can take many years, there is nevertheless a desire to have that accomplished as quickly as possible, not only to increase the safety of those who might have to be at the site but also to allow for the desired use of others (for example, golfers) and to enhance the environment of those who live in the area as soon as is reasonably possible.

Toward that end, bioreactor landfills have been used to modify solid waste landfills by re-circulating and injecting leachate/liquid and air to enhance the consolidation of waste and reduce the time required for landfill stabilization. To accomplish this, vertical injection pipes and horizontal pipe fields have most often been used. With these structures, a liner is commonly provided at the bottom of the site, which liner may be used to trap leachate which has run through the collected waste above, with pipes in that area used to collect the leachate and draw it out for re-circulation by pumping it out and distributing/dispersing the leachate back into the upper portions of the waste site through, for example, perforated pipes and/or horizontal trenches.

Unfortunately, vertical injection pipes and horizontal pipe fields have been costly, time consuming to install and maintain, and not entirely effective for a number of reasons. As one example, the pipes are susceptible to clogging. As another example, the necessary use of a large number of pipes in a pipe field in order to widely distribute the leachate over a large area is not only costly, but even then virtually impossible to evenly distribute the leachate over that large area. That is, the leachate will be distributed in large part to those areas adjacent to the pipes or trenches and less so to the areas between the pipes or trenches. Typical trench spacing may be 100 to 200 feet horizontally and 40 feet vertically. As a result, such spacing significantly risks uneven or differential settling of the waste. Such differential settling, particularly in the context of such systems being in place for a number of years during which time additional layers of tons of additional waste are added on top of the original waste layers and pipe fields (and during which time heavy equipment is frequently moving around on top of the site), causes such pipe systems to be very susceptible to stress cracks and other damage, particularly given the common use of high density (stiff) resin to manufacture the pipes.

The present invention is directed toward overcoming one or more of the problems set forth above.

SUMMARY OF THE INVENTION

In one aspect of the invention, a fluid distribution structure is provided for use with a waste collection site. The structure includes a permeable material adapted for placement on one level of collected waste and adapted to receive another level of collected waste thereon, and further includes a pipe extending upwardly from the permeable material and adapted to receive the fluid. The permeable material includes a top layer, a bottom layer, and a spacing layer between the top and bottom layers, and the pipe has a lower end secured to the permeable material to discharge the fluid between the permeable material top and bottom layers. The fluid may be liquid, including leachate, or gas, or a combination thereof.

In different forms of this aspect of the invention, the top layer is one of a woven geotextile, needle punched non-woven geotextile or continuous filament geotextile, and/or the bottom layer is one of a woven geotextile, needle punched non-woven geotextile or continuous filament geotextile.

In another form of this aspect of the invention, the pipe lower end has discharge openings therein disposed above the bottom layer, and the top layer is secured around the discharge openings whereby fluid discharged from the openings is between the top and bottom layers.

In still another form, the pipe lower end includes an outwardly tapered discharge manifold, and the top layer is secured around the manifold whereby liquid discharged from the manifold is between the top and bottom layers. The manifold may be a downwardly facing cone over an aggregate fill adapted to allow flow of the fluid therethrough. The cone may also be perforated about its surface to discharge fluid out of the cone and beneath the top layer.

In further forms, one or more feeder headers extend generally horizontally through a level of collected waste above the one level of collected waste and discharge fluid into a plurality of horizontally spaced pipes.

In still another form of this aspect of the invention, the permeable material bottom layer has a flow rate $F_B$ of liquid therethrough, and the top layer has a flow rate $F_T$ of liquid therethrough, where $F_B < F_T$.

In yet another form of this aspect of the invention, the spacing layer maintains a space between the top layer and the bottom layer, with the space being open to permit flow of liquid therein to distribute the liquid through the permeable material. The spacing layer may, in one form, be a geonet, geogrid, or mesh.

In another aspect of the present invention, a waste collection site is provided, including three layers of waste. A first geocomposite is between the first two layers of waste, and a second geocomposite is between the second and third layers of waste. A first plurality of pipes extend upwardly into the second layer of waste from the first geocomposite, and a second plurality of spaced pipes extending upwardly into the third layer of waste from the second geocomposite. At least one feeder header feeds leachate into an upper end of each of the pipes. The first and second geocomposites each include a top layer, a bottom layer, and a spacing layer between the top and bottom layers, and each of the pipes has a lower end secured to the geocomposite to discharge leachate between the top and bottom layers.

In one form of this aspect of the present invention, the pipe lower ends have discharge openings therein disposed above the bottom layer, and the top layer is secured around the discharge openings whereby leachate discharged from the openings is between the top and bottom layers. The spacing layer of the geocomposites may be disposed between the discharge openings and the top layer at each pipe lower end.

In another form of this aspect of the invention, the pipe lower ends include an outwardly tapered discharge manifold, and the top layer is secured around the discharge manifold whereby leachate discharged from the manifold is between the top and bottom layers. The discharge manifold may be a downwardly facing cone over an aggregate fill adapted to allow flow of leachate therethrough, and the cone may be perforated about its surface to discharge leachate out of the cone and beneath the top layer.

In yet another form of this aspect of the invention, the feeder header includes generally horizontal pipes in at least one of the second and third layers of waste, wherein the horizontal pipes discharge leachate into the tops of the first and second plurality of pipes.

In still another form of this aspect of the present invention, the bottom layer of the first geocomposite has a flow rate $F_{1B}$ of leachate therethrough, and the top layer of the first geocomposite has a flow rate $F_{1T}$ of leachate therethrough, where $F_{1B}<F_{1T}$. Similarly, the bottom layer of the second geocomposite may have a flow rate $F_{2B}$ of leachate therethrough, and the top layer of the second geocomposite a flow rate $F_{2T}$, where $F_{2B}<F_{2T}$.

In a still further form of this aspect of the invention, the spacing layer maintains a space between the top layer and the bottom layer, with the space being open to permit flow of leachate therein to distribute the leachate through the geocomposite.

Additionally, the spacing layer may comprise one of a geonet or mesh, and the top and/or bottom layers may comprise one of a woven geotextile, needle punched non-woven geotextile or continuous filament geotextile.

In still another aspect of the present invention, a method of distributing leachate at a waste collection system is provided, comprising the steps of providing a geocomposite on one level of collected waste, adding collected waste above the material layer, and inputting leachate at spaced locations in the added collected waste above the material layer. The provided geocomposite includes a top layer, a bottom layer, and a spacing layer between the top and bottom layers, and inputting leachate includes injecting leachate between the top and bottom layers of the geocomposite whereby the spacing layer allows flow of the leachate between the top and bottom layers.

In one form of this aspect of the invention, the provided geocomposite has a bottom layer with a flow rate $F_B$ of leachate therethrough and a top layer with a flow rate $F_T$ of leachate therethrough, where $F_B<F_T$.

In yet another aspect of the invention, a method of modifying a non-woven needle punched geotextile is provided, including the steps of calendaring the non-woven needle punched geotextile, and needle punching the non-woven needle punched geotextile after the calendaring step.

In one form of this aspect of the invention, the calendaring step includes passing the non-woven needle punched geotextile between two heated cylinders. The non-woven needle punched geotextile may also be pressured between the heated cylinders.

In another form of this aspect of the invention, the needle punching creates openings greater than 0.3 mm.

In yet another form, the needle punching step comprises passing the calendared non-woven needle punched geotextile through a needle loom.

BRIEF DESCRIPTION OF THE DRAWINGS

FIG. 2 is a detailed cross-sectional view of a portion of FIG. 1;

FIG. 3 is a cross-sectional view of a geocomposite which may be used in accordance with the present invention

DETAILED DESCRIPTION OF THE INVENTION

In accordance with the present invention and as described in detail below, a leachate distribution structure 10 is provided whereby a waste collection site such as a landfill may be created as a bioreactor landfill in which leachate may be continuously and evenly re-circulated so as to pass down through the collected waste at the site. Geocomposites 14 formed of permeable material are used to cover layers of the waste as it is collected, with vertical pipes 22 extending up through the collected waste to allow leachate fed though feeder headers 26 to be distributed not only down into different levels of the collected waste, but to be distributed laterally throughout the commonly large area of the collected waste through the geocomposites 14 as described in more detail below. Such excellent distribution of the leachate significantly enhances the consolidation of waste, significantly reduces the risk of differential settlement, and reduces the time required for stabilization of the collected waste.

Figure 1:
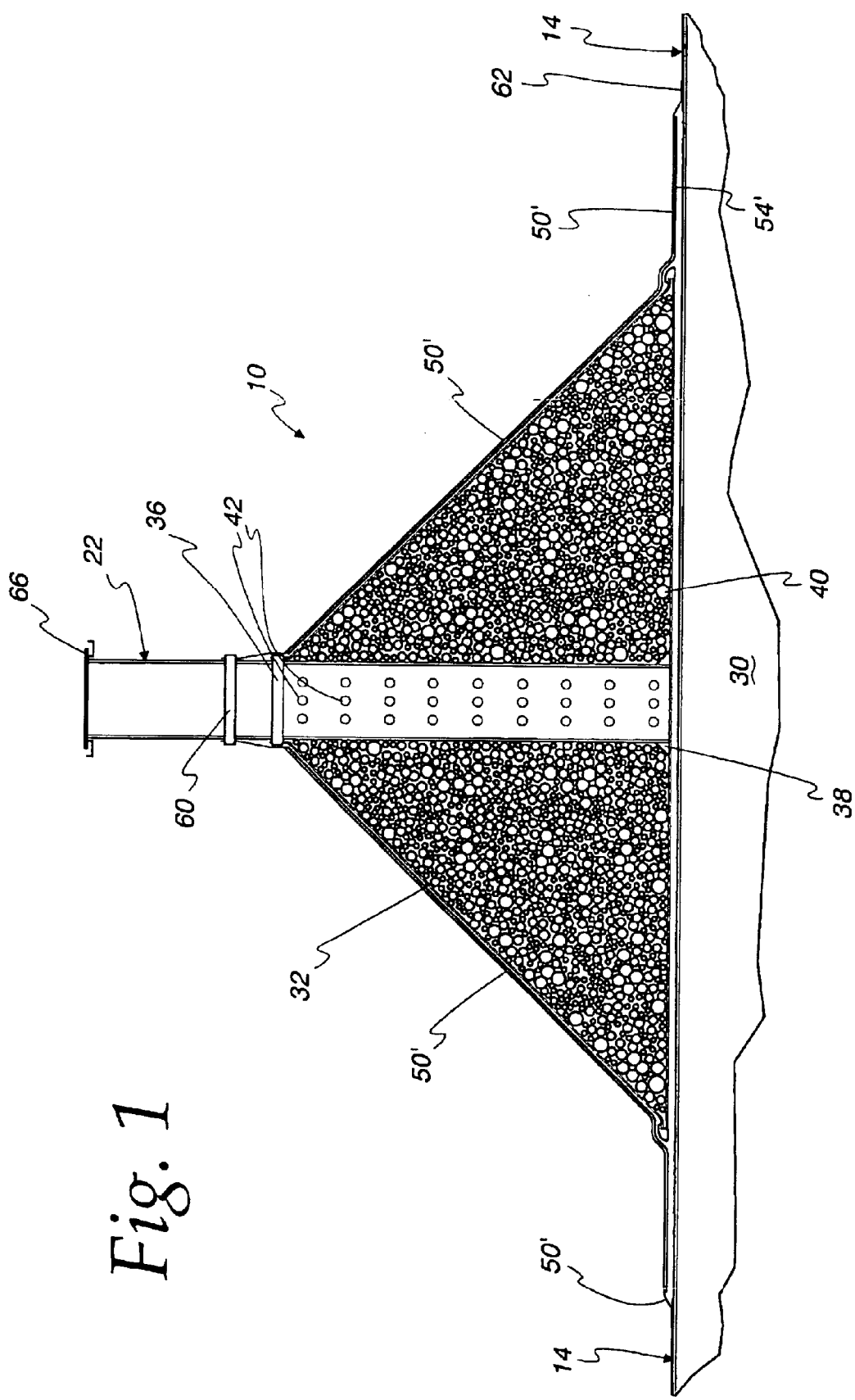
FIG. 1 is a side cross-sectional view of the connection of a vertical pipe to a geocomposite in accordance with the present invention.

FIG. 1 illustrates a portion of the leachate distribution structure 10. In particular, a portion of a geocomposite 14 is illustrated as it is connected to a vertical pipe 22. In accordance with the present invention, the geocomposite 14 will be placed on top of a layer of collected waste 30 and will extend to cover a large surface area of such waste 30.

Figure 5:
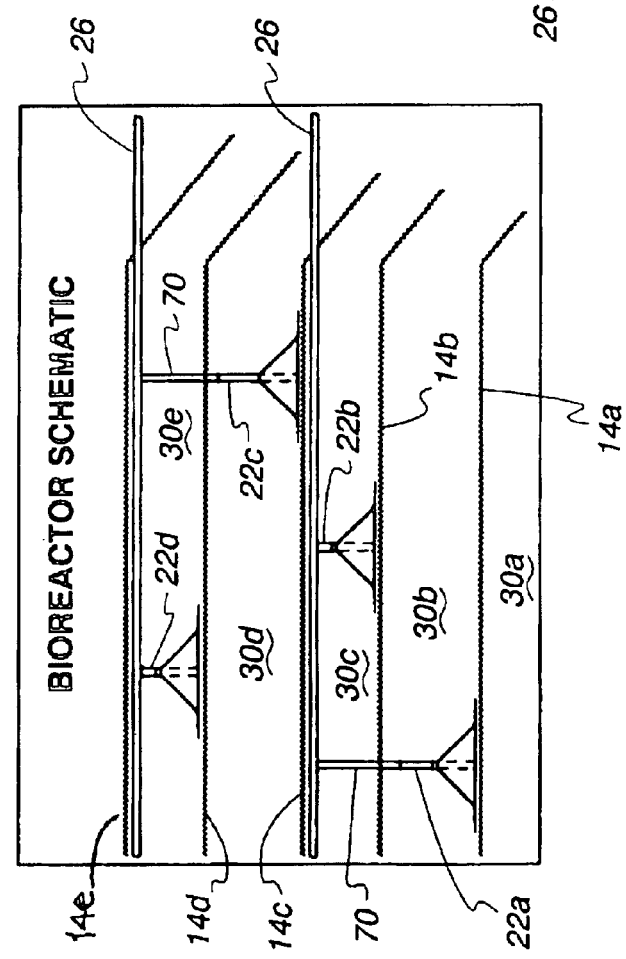
FIG. 5 is a schematic similar to FIG. 4, but in the nature of a cross-section along a horizontal plane through the waste collection site.

At spaced locations (e.g., at 4–5 locations per acre) around that area such as illustrated in FIG. 5 and discussed further below, a vertical pipe 22 will be secured to the geocomposite 14 as illustrated in FIGS. 1–2. In the advantageous form illustrated in these figures, an inverted conical support 32 is suitably secured around the lower end of the pipe 22, for example by a clamp 36 and an extrusion weld 38. Suitable fill 40 such as stone aggregate is provided within the conical support 32 to help to secure the pipe 22 on the geocomposite 14 (particularly, e.g., when it is placed on top of the geocomposite 14 and before additional waste for a new layer is added around it), and also to help to strengthen the support 32 against collapse from the weight of additional waste added around and on top of it thereafter. The fill 40 also helps to distribute the migration or flow of leachate as described below, with the conical support 32 thereby also serving as a radial distribution manifold as described hereafter. While not intended to limit the scope of the invention in any way, to give an appreciation of the workings of the invention for illustrative purposes only, it should be noted that the flow of leachate through the manifold/conical support 32 may be on the order of 100 gallons per minute.

The lower portion of the vertical pipe 22 includes perforations 42 through which leachate pumped into the pipe 22 may pass. From the vertical pipe perforations 42, the leachate will pass through the fill 40 and then ultimately through perforations 46 in the tapered side walls and bottom wall of the conical support 32 (see FIG. 2).

Broadly, as best seen in FIG. 3, the geocomposite 14 is a composite of three different layers: a top layer 50, a bottom layer 52, and a spacing layer 54 between the top and bottom layers 50, 52. Leachate may desirably leak through both the top and bottom layers 50, 52 as described hereafter. Further, the bottom layer 52 may have a flow rate $F_B$ of leachate therethrough, and the top layer 50 may have a flow rate $F_T$ of leachate therethrough. The spacing layer 54 provides a suitable path whereby leachate at a location in the spacing layer 54 which is more than may immediately leak through the bottom layer 52 will migrate laterally through the spacing layer 54 until it is able to leak through the bottom layer 52. In this manner, unequal pockets of leachate may be advantageously dispersed out over the site. As further explained hereafter, $F_B$ may also advantageously be less than $F_T$. As one example, the top layer 50 may have openings on the order of greater than about 11% of its surface (it has been found that woven geotextiles with openings of greater than about 11% are difficult to clog in applications of this type) and the bottom layer 52 may have openings on the order of 5–6%. Still further details of advantageous aspects of these layers 50, 52, 54 are described further below.

Where secured to a vertical pipe 22, the top layer 50 of the geocomposite 14 is removed so that the vertical pipe 22 and support 32 essentially sit on the spacing layer 54. Moreover, a spacing layer 54' and top layer 50' are also secured over the conical support 32. Specifically, a section of top layer material is provided over the conical support 32, and is suitably secured at its upper end to the vertical pipe 22 (as by the clamp 60) and is suitably secured to the top layer 50 (as by a heat bond 62) around the perimeter of the area in which the top layer is removed.

It should be appreciated that, with the above structure, leachate which is supplied into the vertical pipe 22 will pass out the pipe perforations 42 and migrate through the fill 40 until it passes out the support perforations 46 into a space which is beneath the top layer 50', with the spacing layer 54' between the outer surface of the conical support 32 and the top layer 50'. The leachate may thus migrate through the conical spacing layer 54' down to the spacing layer 54 at the bottom of the conical support 32 and about its perimeter, from which it may then migrate outwardly through the spacing layer 54 between the top and bottom layers 50, 52 as described further below. Of course, leachate may also migrate through the fill 40 to the perforations 46 in the bottom of the conical support, and from there pass directly to the spacing layer 54 therebeneath.

As one example, the vertical pipe 22 may be a 4 inch diameter SDR21 HDPE pipe with a stub end 66 which may be secured to a similar pipe extension where required. The conical support 32 may be filled with 57+stone, and may be vacuum formed 100 mil HDPE, with a height on the order of 16 inches and a base diameter on the order of 40 inches. The base of the conical support 32 may be formed of ⅜ inch thick HDPE, with a diameter on the order of 48 inches, with an extrusion weld 68 (see FIG. 2) securing the base and conical portions. The perimeter of the area in which the top layer of the geocomposite 14 is removed may have a diameter on the order of 72 inches (providing a space of about 12 inches around the base of the conical support to simplify locating the support on the geocomposite 14). However, it should be understood that these details are merely examples provided to give a general of one workable construction of the vertical pipe 22 and conical support 32, without intending to limit the scope of the invention in any way. It should be understood that many different variations of this structure could be used within the scope of the invention described herein, including different sizes, materials and shapes. For example, while the conical shape of the support 32 may advantageously be used to disperse leachate as is further described herein, still other shapes could also be used within the scope of the present invention, including the cylindrical shape of the pipe 22.

Figure 4:
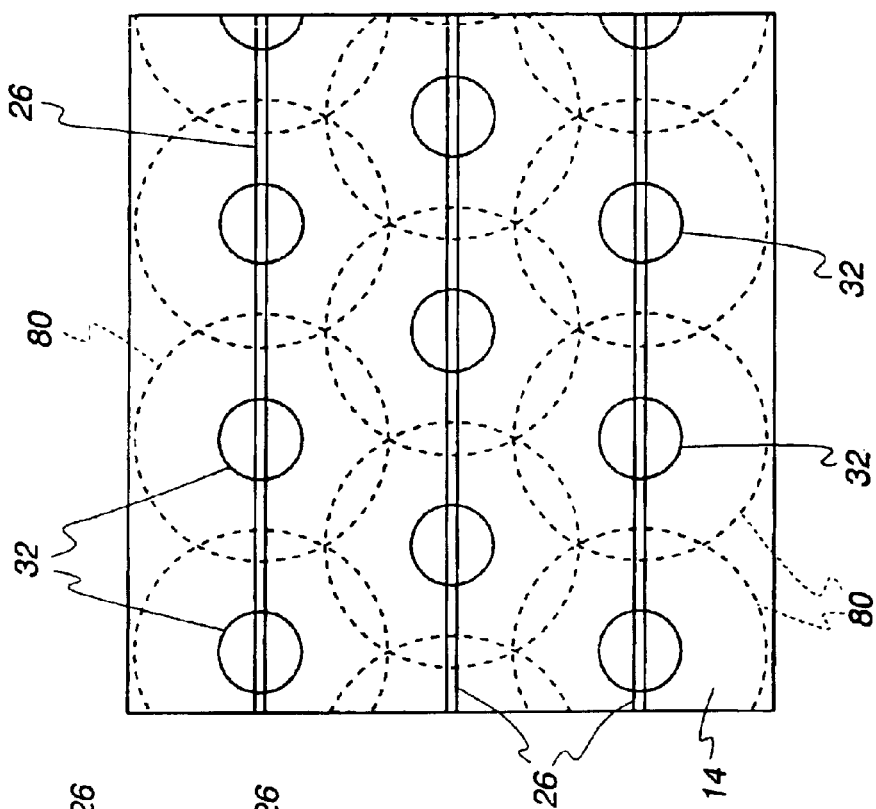
FIG. 4 is a schematic illustrating a side view of a waste collection site (in the nature of a cross-section along a vertical plane through the waste collection site) according to the present invention.

FIGS. 4–5 (which are not intended to be of scale) illustrate the manner in which the present invention may be used in a waste collection site over time.

Specifically, as illustrated in FIG. 4, as the site is initially used, a first level of collected waste 30a is accumulated, after which a geocomposite 14a is placed thereon with spaced vertical pipes 22a. At that point in time in the "life" of the waste collection site, the vertical pipes 22a will extend above the ground layer and leachate may be pumped into the vertical pipes 22a using suitable hoses or the like. Thereafter, further waste will be added to the site, ultimately forming a second level of collected waste 30b on top of the first geocomposite 14a, and a second geocomposite 14b may then be placed thereon with spaced vertical pipes 22b. Pipe extensions 70 may be added to the stub ends 66 of the vertical pipes 22a to extend their upper end to the level of the upper end of the vertical pipes 22b, whereby feeder headers 26 may ultimately be attached to the upper ends of the vertical pipes (or their extensions) to facilitate circulation of leachate of all of the vertical pipes for re-circulation through the collected waste 30a, 30b beneath the geocomposites 14a, 14b. Again, as still more waste is collected and added to the site, a third level of collected waste 30c may ultimately be formed on top of the second geocomposite 14b, at which point a third geocomposite 14c may be placed thereon with spaced vertical pipes 22c.

Progressive addition of collected waste may then similarly proceed to a fourth level of collected waste 30d, with a fourth geocomposite 14d and vertical pipes 22d, and a fifth level of collected waste 30e and geocomposite 14e thereon. Such continued accumulation of waste may continue in this manner until it is determined that no more waste should be added to the site. During that time, the present invention as described may be used to advantageously re-circulate leachate through the waste whereby the site will be a bioreactor landfill which will relatively quickly stabilize with minimal differential settling.

This is further illustrated in FIG. 5, where an advantageous spacing of vertical pipes 22 on a particular geocomposite 14 is illustrated (though not to scale). The pipes 22 are hidden beneath the feeder headers 26, and therefore the conical supports 32 are seen. Specifically, each of the vertical pipes 22 may be considered to radiate outwardly to cover a circular field 80. With the disclosed arrangement, the entire site may be covered by the fields. Of course, the migration of leachate through the spacing layer 54 of the geocomposite 14 is not expected to be a over an exact circle such as illustrated in FIG. 5, nor is such migration from a particular pipe 22 limited to the circular field 80 illustrated. Nonetheless, it should be appreciated that such an arrangement may provide a configuration which will advantageously allow for relatively uniform migration of leachate over a given level of the waste collection site. That is, where the leachate is input through the vertical pipe 22 at a rate which is, for example, a function of the flow rate $F_B$ through the bottom layer 52 of the geocomposite 14 and the area of its field 80, the leachate will not be able to simply leak through the geocomposite bottom layer 52 directly beneath the pipe 22 and conical support 32, but instead will migrate, through the spacing layer 54 whereby it may leak into the waste level therebeneath across substantially the entire field 80.

It should also be appreciated that the leachate will not only reach the geocomposites 14 directly from the spaced vertical pipes 22, but will also drain down through the level of collected waste 30 on the geocomposite 14. Thus, while the provision of the invention described herein on that level of collected waste will assist in ensuring that leachate will migrate relatively uniformly therethrough, given the variations in the waste and shifting which can occur during the years of use the reality is that even a perfectly uniformly distributed leachate leaking into the top of the layer will no longer be so evenly distributed at the bottom of the layer. In that case, where the leachate migration in a heavy flow area is greater than the flow rate $F_T$ of the top layer 50 will permit to immediately pass therethrough, the top layer 50 will hold up the leachate to some degree, during which time it will tend to migrate outwardly and thereby disperse the heavy flow in that area. Similarly, where the bottom layer 52 is advantageously formed with a flow rate $F_B$ of leachate therethrough which is less than the flow rate $F_T$ of leachate through the top layer 50 as previously noted, it should be appreciated that still further outward dispersion from the heavy flow areas will occur through the spacing layer 54 before the leachate passes through the bottom layer 52.

As illustrated in FIG. 4, the geocomposites 14 may be extended so as to slope downwardly on the ends. This may be used to assist in diverting leachate to the side of the waste collection site from which it may more freely drain, particularly in the event that excessively heavy leachate is entering the site.

It should also be understood that while the system may be advantageously used with a liquid such as leachate, the present invention may similarly be used in applications in which other fluids, including gases such as air and mixes of liquids and gases, are desired to be dispersed in a mass.

Reference will now be had to the geocomposites 14 which may be advantageously used with the present invention.

As one example, one geocomposite which may be advantageously used with the present invention may be a HDPE bi-planar geonet or geogrid forming the spacing layer 54 and laminated with a woven geotextile on one side (forming the top layer 50) and a non-woven geotextile on the other side (forming the bottom layer 52). Either of the geotextiles advantageously may, however, be a woven geotextile, a non-woven needle punched geotextile, or a continuous filament geotextile.

In the present example, the woven geotextile forming the top layer 50 may advantageously have the following properties:

| Material Type | Polyethylene, Polypropylene, Polyester or Polyvinyl chloride (fibers) |
|---|---|
| Percent Open Area (%) | 9.0 to 13.0 |
| Apparent Opening Size (mm) | 1.0 to 0.300 |
| Thickness (mils) | 10 to 200 |
| Permittivity range (sec$^{-1}$) | 0.2 to 1.5 |
| Mass per unit area (oz/yd$^2$) | 4 to 20 |
| Water flow rate range (gpm/ft$^2$) | 15 to 300 |
| Grab tensile strength (lbs) | 100 to 500 |
| Grab elongation range (%) | 20 to 100 |
| Puncture strength range (lbs) | 50 to 300 |
| Mullen burst strength (psi) | 200 to 800 |
| Trapezoidal tear strength (lbs) | 50 to 170 |
| Permeability rate (cm/sec) | 0.01 to 0.5 |

In the present example, the non-woven geotextile forming the bottom layer 52 may advantageously be manufactured with multiple layers and may have the following properties:

| Material Type | Polyethylene, Polypropylene, Polyester, or Polyvinyl chloride |
|---|---|
| Mass Per Unit Area, g/m$^2$ | 4.0 to 32.0 |
| Apparent Opening Size (mm) | 0.1 to 0.5 |
| Thickness (mils) | 10 to 200 |
| Permittivity range (sec$^{-1}$) | 0.2 to 1.5 |
| Mass per unit area (oz/yd$^2$) | 4 to 20 |
| Water flow rate range (gpm/ft$^2$) | 15 to 300 |
| Grab tensile strength (lbs) | 100 to 500 |
| Grab elongation range (%) | 20 to 100 |
| Puncture strength range (lbs) | 50 to 300 |
| Mullen burst strength (psi) | 200 to 800 |
| Trapezoidal tear strength (lbs) | 50 to 170 |
| Permeability rate (cm/sec) | 0.01 to 0.5 |

The geonet or geogrid forming the spacing layer 54 may advantageously have the following properties:

| Material Type | Polyvinyl chloride, Polypropylene, Polyester, Polyethylene, HDPE |
|---|---|
| Weight (oz/yd$^2$) | 1 to 20 |
| Ultimate tensile strength (lb/ft$^2$) | 10 to 70 |
| Thickness mils | 160–300 |
| Tensile strength (ppi) | 0 to 2000 |
| Aperture size (inches) | 0.01 to 2.0 |
| Density (gm/cm$^3$) | 0.92 to 0.95 |

It should be understood, however, that the above characteristics of materials which may be used for the geocomposite layers 50, 52, 54 are only examples, and that a large number of materials which may or may not meet all of the above characteristics could still be used within the scope of various aspects of the invention. For example, any geocomposite having a bottom layer with a lower flow rate than the top layer and with a space maintained between the layers to allow lateral flow of leachate in that space would be suitable to obtain that previously described advantage. As another example, different opening sizes than indicated in the example may be used if the spacing layer 54 maintains an adequate spacing between the top and bottom layers 50, 52 so that lateral leachate dispersion is allowed such as described.

Additionally, woven geotextiles may not be readily laminated to geonets. Therefore, in order to provide a desired securement between the bottom and spacing layers 52, 54, the bottom layer 52 of the geocomposite 14 may advantageously be non-woven. (Securement of the top layer 50 to the spacing layer 54 is not as difficult, or as important, to maintain, thereby allowing the advantageous use of a woven geotextile for the top layer 50 in the above example, particularly where significantly larger opening sizes are provided.) Non-woven geotextiles having maximum opening size of about 0.2 mm are generally available, but non-woven (needle punched) products having opening sizes larger than 0.3 mm are not so readily available, with woven geotextiles generally required for such larger opening sizes. However, as indicated in the example above, non-woven geotextiles having opening sizes larger than 0.3 mm may be advantageously used in the bottom layer 52 with the present invention. Particularly given the long term use of the geocomposites 14 such as described, such larger size openings allow fine soil particles to move through the geotextile and make it less prone to severe clogging by fine particulates, suspended solids and microbial growth. Therefore, applicant has additionally developed such an advantageous non-woven needle punched geotextile which may be advantageously used as a part of the geocomposite 14 of the present invention.

Specifically, a suitable geotextile may be formed by further processing of a non-woven needle punched geotextile, including specifically (1) calendaring the non-woven needle punched geotextile by passing it between two heated cylinders which pressure the geotextile therebetween, and then (2) needle punching the non-woven needle punched geotextile after the calendaring step, where the needle punching is accomplished by passing the calendared non-woven needle punched geotextile through a needle loom which creates openings greater than 0.3 mm.

For example, applicant has produced a geotextile using as a starting geotextile the NW6 6 oz. geotextile of GSE Lining Technology, Inc. of Houston, Tex. Processing in accordance with the above method produced a geotextile with the following characteristics (with the characteristics of the NW6 starting geotextile also shown for comparison):

| Test Property | NW6 Geotextile | NW6 Geotextile after Calendaring and Needle Punching |
|---|---|---|
| Mass (oz./sq. yard) | 6 | 6.5 |
| Thickness (mils) | 80 | 53 |
| Grab strength (lbs) | 170 | 209 |
| Grab tensile elongation (%) | 50 | 86 |
| Mullen burst strength (psi) | 330 | 345 |
| Puncture strength (lbs) | 110 | 110 |
| Apparent opening size (mm) | 0.21 | 0.45 |
| Permittivity ($sec^{-1}$) | 1.5 | 2.0 |

This calendared geotextile has a stiffness, drape and physical appearance which is similar to a heat bonded geotextile and, therefore, like heat bonded geotextiles, will advantageously result in less intrusion into a geonet of the spacing layer 54 to which it may be secured and therefore may provide advantageous transmissivity of the formed geocomposite 14.

Of course, the improved geotextile described above may also have advantageous use in applications other than the leachate distribution system described herein.

Still other aspects, objects, and advantages of the present invention can be obtained from a study of the specification, the drawings, and the appended claims. It should be understood, however, that the present invention could be used in alternate forms where less than all of the objects and advantages of the present invention and preferred embodiment as described above would be obtained.

What is claimed is:

1. A fluid distribution structure for use with a waste collection site, comprising:
   a permeable material adapted for placement on one level of collected waste and adapted to receive another level of collected waste thereon, said permeable material including a top layer, a bottom layer, and a spacing layer between said top and bottom layers; and
   a pipe extending upwardly from said permeable material and adapted to receive said fluid, said pipe having a lower end secured to said permeable material to discharge said fluid between said permeable material top and bottom layers.

2. The fluid distribution structure of claim 1, wherein said fluid is liquid.

3. The fluid distribution structure of claim 2, wherein said fluid is leachate.

4. The fluid distribution structure of claim 1, wherein said fluid is gas.

5. The fluid distribution structure of claim 1, wherein said top layer is secured around said pipe lower end whereby fluid discharged from an outwardly tapered portion around said pipe lower end is between said top and bottom layers.

6. The fluid distribution structure of claim 1, further comprising a feeder header adapted to extend generally horizontally through a level of collected waste above said one level of collected waste.

7. The fluid distribution structure of claim 1, wherein said bottom layer has a flow rate $F_B$ of fluid therethrough, and said top layer has a flow rate $F_T$ of fluid therethrough, where $F_B$ is unequal to $F_T$.

8. The fluid distribution structure of claim 1, wherein said spacing layer maintains a space between said top layer and said bottom layer, said space being open to permit flow of fluid therein to distribute said fluid through said permeable material.

9. A liquid distribution structure for use with a waste collection site, comprising:
   a geocomposite adapted for placement on one level of collected waste and adapted to receive another level of collected waste thereon, said geocomposite including a top layer, a bottom layer, and a spacing layer between said top and bottom layers; and
   a pipe extending upwardly from said geocomposite and adapted to receive re-circulated liquid, said pipe having a lower end secured to said geocomposite to discharge liquid between said geocomposite top and bottom layers.

10. The liquid distribution structure of claim 9, wherein said liquid is leachate.

11. The liquid distribution structure of claim 9, wherein said top layer is one of a woven geotextile, needle punched non-woven geotextile or continuous filament geotextile.

12. The liquid distribution structure of claim 9, wherein said bottom layer is one of a woven geotextile, needle punched non-woven geotextile or continuous filament geotextile.

13. The liquid distribution structure of claim 9, wherein said pipe lower end has discharge openings therein disposed above said bottom layer, and said top layer is secured around said discharge openings whereby liquid discharged from said openings is between said top and bottom layers.

14. The liquid distribution structure of claim 13, wherein said spacing layer is disposed between said discharge openings and said top layer.

15. The liquid distribution structure of claim 9, wherein said pipe lower end includes an outwardly tapered portion, and said top layer is secured around said outwardly tapered portion whereby liquid discharged from said outwardly tapered portion is between said top and bottom layers.

16. The liquid distribution structure of claim 15, wherein said outwardly tapered portion is a downwardly facing cone over an aggregate fill adapted to allow flow of liquid therethrough.

17. The liquid distribution structure of claim 16, wherein said cone is perforated about its surface to discharge liquid out of said cone and beneath said top layer.

18. The liquid distribution structure of claim 9, further comprising a liquid feeder header adapted to extend generally horizontally through a level of collected waste above said one level of collected waste.

19. The liquid distribution structure of claim 9, further comprising a plurality of said pipes horizontally spaced, each of said pipes having a lower end secured to said geocomposite and adapted to discharge liquid between said top and bottom layers.

20. The liquid distribution structure of claim 19, further comprising liquid feeder headers extending generally horizontally through a level of collected waste above said one level of collected waste, wherein said liquid feed headers discharge liquid into the tops of said pipes.

21. The liquid distribution structure of claim 9, wherein said bottom layer has a flow rate $F_B$ of liquid therethrough, and said top layer has a flow rate $F_T$ of liquid therethrough, where $F_B < F_T$.

22. The liquid distribution structure of claim 21, wherein $F_T$ is in a water flow rate range of 15 to 300 gpm/ft$^2$.

23. The liquid distribution structure of claim 9, wherein said spacing layer maintains a space between said top layer and said bottom layer, said space being open to permit flow of liquid therein to distribute said liquid through said geocomposite.

24. The liquid distribution structure of claim 23, wherein said spacing layer comprises one of a geonet or mesh.

25. A waste collection site, comprising:
   a first layer of waste;
   a first geocomposite disposed on said first layer of waste;
   a second layer of waste on said first geocomposite;
   a second geocomposite disposed on said second layer of waste;
   a third layer of waste on said second geocomposite;
   a first plurality of pipes extending upwardly into said second layer of waste from said first geocomposite;
   a second plurality of spaced pipes extending upwardly into said third layer of waste from said second geocomposite; and
   at least one feeder header adapted to feed leachate into an upper end of each of said pipes;
   wherein
      said first and second geocomposites each include a top layer, a bottom layer, and a spacing layer between said top and bottom layers, and
      each of said pipes has a lower end secured to said geocomposite to discharge leachate between said top and bottom layers.

26. The waste collection site of claim 25, wherein said pipe lower ends have discharge openings therein disposed above said bottom layer, and said top layer is secured around said discharge openings whereby leachate discharged from said openings is between said top and bottom layers.

27. The waste collection site of claim 26, wherein said spacing layer of said geocomposites is disposed between said discharge openings and said top layer at each pipe lower end.

28. The waste collection site of claim 25, wherein said pipe lower ends include an outwardly tapered portion, and said top layer is secured around said outwardly tapered portion whereby leachate discharged from said outwardly tapered portion is between said top and bottom layers.

29. The waste collection site of claim 28, wherein said outwardly tapered portion is a downwardly facing cone over an aggregate fill adapted to allow flow of leachate therethrough.

30. The waste collection site of claim 29, wherein said cone is perforated about its surface to discharge leachate out of said cone and beneath said top layer.

31. The waste collection site of claim 25, wherein said feeder header includes generally horizontal pipes in at least one of said second and third layers of waste, wherein said horizontal pipes discharge leachate into the tops of said first and second plurality of pipes.

32. The waste collection site of claim 25, wherein said bottom layer of said first geocomposite has a flow rate $F_{1B}$ of leachate therethrough, and said top layer of said first geocomposite has a flow rate $F_{1T}$ of leachate therethrough, where $F_{1B} < F_{1T}$.

33. The waste collection site of claim 32, wherein $F_{1T}$ is in a water flow rate range of 15 to 300 gpm/ft$^2$.

34. The waste collection site of claim 32, wherein said bottom layer of said second geocomposite has a flow rate $F_{2B}$ of leachate therethrough, and said top layer of said second geocomposite has a flow rate $F_{2T}$ of leachate therethrough, where $F_{2B} < F_{2T}$.

35. The waste collection site of claim 25, wherein said spacing layer maintains a space between said top layer and said bottom layer, said space being open to permit flow of leachate therein to distribute said leachate through said geocomposite.

36. The waste collection site of claim 35, wherein said spacing layer comprises one of a geonet or mesh.

37. The waste collection site of claim 25, wherein said top layer is one of a woven geotextile, needle punched non-woven geotextile or continuous filament geotextile.

38. The waste collection site of claim 25, wherein said bottom layer is one of a woven geotextile, needle punched non-woven geotextile or continuous filament geotextile.

39. A fluid distribution structure for use with a waste collection site, comprising:
   a permeable material adapted for placement on one level of collected waste and adapted to receive another level of collected waste thereon, said permeable material including a top layer, a bottom layer, and a spacing layer between said top and bottom layers, said spacing layer maintaining an open space between said top layer and said bottom layer; and
   a fluid conduit extending upwardly from said permeable material with a lower end secured to said permeable material to discharge said fluid into said open space between said permeable material top and bottom layers wherein said spacing layer permits flow of fluid in said open space to distribute said fluid through said permeable material.

40. The fluid distribution structure of claim 39, wherein said fluid is leachate.

41. The fluid distribution structure of claim 39, wherein said top layer is secured around said fluid conduit lower end whereby fluid discharged from an outward tapered portion around said fluid conduit lower end is between said top and bottom layers.

42. The fluid distribution structure of claim 39, wherein said bottom layer has a flow rate $F_B$ of fluid therethrough, and said top layer has a flow rate $F_T$ of fluid therethrough, where $F_B$ is unequal to $F_T$.

* * * * *